United States Patent
McMorrow et al.

(10) Patent No.: US 12,039,051 B2
(45) Date of Patent: Jul. 16, 2024

(54) EFFICIENTLY DELIVERING FIRMWARE TO BE INSTALLED IN A PLURALITY OF REMOTELY LOCATED ENGINE-CONTROL COMPUTERS

(71) Applicant: Insight Direct USA, Inc., Tempe, AZ (US)

(72) Inventors: Mitchell Patrick McMorrow, Walla Walla, WA (US); Mark Candelora, Reading, MA (US); James Laurora, Odessa, FL (US); Marc Brumfield, Lemont, IL (US); Ben Kotvis, Sussex, WI (US)

(73) Assignee: Insight Direct USA, Inc., Chandler, AZ (US)

( * ) Notice: Subject to any disclaimer, the term of this patent is extended or adjusted under 35 U.S.C. 154(b) by 92 days.

(21) Appl. No.: 17/857,703

(22) Filed: Jul. 5, 2022

(65) Prior Publication Data
US 2024/0012908 A1     Jan. 11, 2024

(51) Int. Cl.
*G06F 21/57* (2013.01)
*G06F 8/61* (2018.01)

(52) U.S. Cl.
CPC ............. *G06F 21/572* (2013.01); *G06F 8/61* (2013.01)

(58) Field of Classification Search
CPC .......................... G06F 8/60–66; G06F 21/572
USPC ................................................. 717/168–178
See application file for complete search history.

(56) References Cited

U.S. PATENT DOCUMENTS

| 10,212,038 | B2 | 2/2019 | Albrecht et al. |
| 10,404,760 | B2 | 9/2019 | Kolbe et al. |
| 10,992,521 | B2 | 4/2021 | Sorenson et al. |
| 2005/0038874 | A1* | 2/2005 | Ramaswamy ........ H04L 67/568 709/219 |
| 2013/0097236 | A1* | 4/2013 | Khorashadi ........... G06F 16/951 709/204 |

(Continued)

FOREIGN PATENT DOCUMENTS

CA          2726510 A1 *  6/2011  ............... G06F 8/61

OTHER PUBLICATIONS

Network address translation, Wikipedia, 2020, 14 pages, [retrieved on Nov. 30, 2023], Retrieved from the Internet: <URL:https://web.archive.org/web/20201223201318/https://en.wikipedia.org/wiki/Network_address_translation>.*

(Continued)

*Primary Examiner* — Geoffrey R St Leger
(74) *Attorney, Agent, or Firm* — Kinney & Lange, P.A.

(57) ABSTRACT

Apparatus and associated methods relate to delivering firmware to be installed in a plurality of remotely located engine-control computers in an efficient manner. Local-area-network connection is provided to an engine-control computer configuration device (ECC configuration device) via a mobile firmware delivery system. Cellular internet connection is also provided to the ECC configuration device via a mobile firmware delivery system. The ECC configuration device makes a request of the mobile firmware delivery system to download a firmware file. The mobile firmware delivery system downloads the firmware file requested if the firmware file requested is not stored in a cache memory. Instead of downloading the firmware file, the mobile firmware delivery system provides the firmware file stored in the cache memory if it is found to be stored there.

20 Claims, 5 Drawing Sheets

(56) References Cited

U.S. PATENT DOCUMENTS

2014/0366012 A1* 12/2014 Jamadagni .............. H04W 4/50
                                                                                  717/171
2015/0074180 A1    3/2015  Sheinfeld
2021/0144192 A1    5/2021  Lee

OTHER PUBLICATIONS

Andrade, Carlos, et al., Managing Massive Firmware-Over-The-Air Updates for Connected Cars in Cellular Networks, Proc of the 2nd ACM International Workshop on Smart, Autonomous, and Connected Vehicular Systems and Services, 2017, 8 pages, [retrieved on Mar. 11, 2024], Retrieved from the Internet: <URL:http://dl.acm.org>.*

* cited by examiner

EFFICIENTLY DELIVERING FIRMWARE TO BE INSTALLED IN A PLURALITY OF REMOTELY LOCATED ENGINE-CONTROL COMPUTERS

BACKGROUND

Because of a supply-chain difficulty in obtaining engine-control computers that control operation of automobile engines (i.e., engine-control computers), many automobile manufactures have a large inventory of automobiles that have been fully manufactured, with the exception of not having an engine-control computer (ECC). These nearly completed automobiles are being parked in very large lots located outside of the manufacturing facility or large fields. The numbers of such nearly-completed vehicles can be so large that such lots or fields are very expansive—some nearly the size of small cities. The expanse of such lots or fields is so great that it would be very expensive to provide local area network access throughout the entire lot or field.

When engine-control computers are delivered, a technician installs them into the automobiles at these lots or fields, and the installed engine-control computers are configured using an ECC configuration device (ECC configuration device). Configuration involves loading one or more firmware files in each newly installed engine-control computer. Such firmware files can be frequently revised, sometimes many times a day. Because of such firmware revision frequency, the ECC configuration device cannot be pre-loaded with firmware files, as such files would be made obsolete in little time. Therefore, the ECC configuration device is configured to download, from the internet, the latest revision of firmware for each engine-control computer being configured.

A cellular hotspot can be used to provide internet connection in such network-deficient areas. But cellular hotspots have bandwidth limitations, and high costs for data downloads. Firmware files used for configuring these engine-control computers can quite large in size (e.g., many gigabytes). Such large firmware files can be slow and expensive to download from the internet using a cellular hotspot.

SUMMARY

Some embodiments relate to a method for efficiently delivering firmware to be installed in a plurality of remotely located engine-control computers. The method includes providing, via a mobile firmware delivery system, local area network (LAN) connection to an ECC configuration device. The method includes providing, via the mobile firmware delivery system, cellular internet connection to the ECC configuration device. The method includes receiving, via the mobile firmware delivery system, a request to download a firmware file by the ECC configuration device. The method includes downloading, via the mobile firmware delivery system, the firmware file requested if the firmware file requested is not stored in a cache memory. The method also includes providing without downloading again, via the mobile firmware delivery system, the firmware file requested if the firmware file requested is stored in the cache memo.

Some embodiments relate to a system for efficiently delivering firmware to be installed in a plurality of remotely located engine-control computers. The system includes a smart router system that provides cellular internet connection to a local area network connected ECC configuration device. The system includes a cache memory for storing firmware files. The system also includes a request interceptor. The request interceptor receives a request to download a firmware file by the ECC configuration device. The request interceptor then downloads the firmware file requested if the firmware file requested is not stored in a cache memory. The request interceptor provides, without downloading again, the firmware file requested if the firmware file requested is stored in the cache memory.

DETAILED DESCRIPTION

Apparatus and associated methods relate to delivering firmware to be installed in a plurality of remotely located engine-control computers in an efficient manner. Local area network connection is provided to an ECC configuration device via a mobile firmware delivery system. Cellular internet connection is also provided to the ECC configuration device via a mobile firmware delivery system. The ECC configuration device makes a request of the mobile firmware delivery system to download a firmware file. The mobile firmware delivery system downloads the firmware file requested if the firmware file requested is not stored in a cache memory. Instead of downloading the firmware file, the mobile firmware delivery system provides the firmware file stored in the cache memo if it is found to be stored there.

Figure 1:
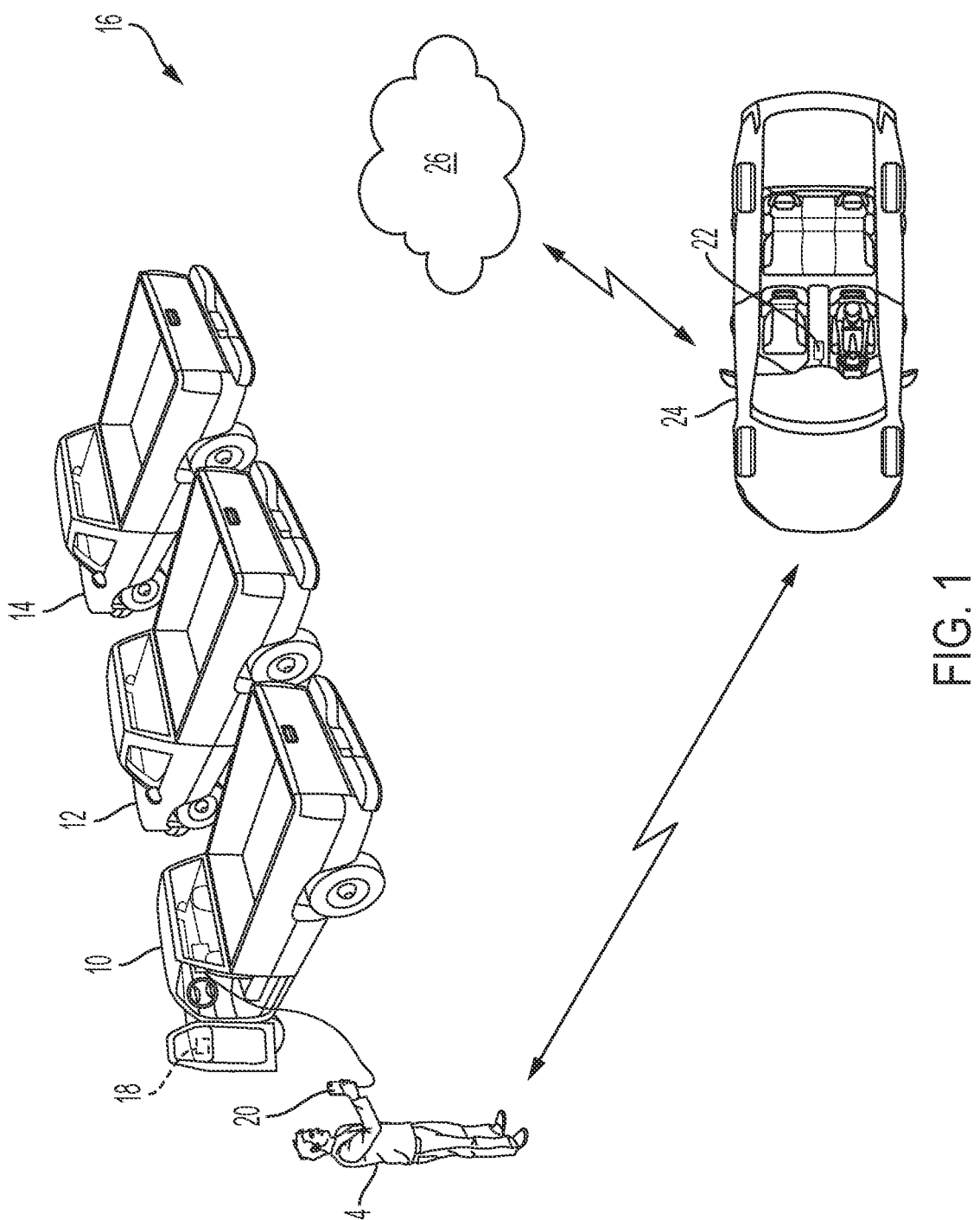
FIG. 1 is a schematic view of a mobile firmware delivery system providing facilitating firmware installation at a remote automobile parking lot.

FIG. 1 is a schematic view of a mobile firmware delivery system providing facilitating firmware installation at a remote automobile parking lot. In FIG. 1, nearly completed automobiles 10, 12, and 14 are parked in remote automobile parking lot 16. No network connectivity is provided at remote automobile parking lot 16. User U has installed engine-control computer 18 in automobile 10. User U has connected ECC configuration device 20 to automobile 10 for the purpose of configuring engine-control computer 18. Automobile 24 provides power and mobility to firmware delivery system 22. Firmware delivery system 22 is configured to provide the latest revisions firmware files to ECC configuration device 20 upon request for such files by ECC configuration device 20.

Firmware delivery system 22 provides wireless network connectivity to devices within a network range about firmware delivery system 22. Firmware delivery system 22 also connects to the internet using a cellular wireless network provided, inter alia, for cellular telephonic communications. Firmware delivery system 22 provides internet connectivity to devices connected to the network established by firmware delivery system 22. ECC configuration device 20 can detect the wireless network established by firmware delivery system 22 and connect thereto, thereby gaining access to internet 24.

ECC configuration device 20 requests to download a firmware file from the internet. Firmware delivery system 22 receives the request transmitted by ECC configuration device 20. ECC configuration device 20 has a request interceptor that intercepts the request transmitted by ECC configuration device 20. The request interceptor then determines if the firmware file requested is stored in a cache memory of firmware delivery system 22. If the firmware file requested is found to be stored in the cache memory of firmware delivery system 22, then the firmware delivery system 22 provides, without downloading again, the firmware file requested to ECC configuration device 20. If, however, the firmware file requested is not found to be stored in the cache memory of firmware delivery system 22, then the firmware delivery system 22 downloads the firmware file requested from cloud 26.

One of the purposes for intercepting the request to download the firmware file is to minimize the volume of data downloaded over the cellular internet connection. Some firmware files can be very large, and so the volume of downloaded data can be significantly reduced by caching such large files locally in a memory cache of firmware delivery system 22. To minimize the volume of data downloaded vie the cellular internet connection, the request interceptor maintains the cache memory in a manner that maximally reduces unnecessary data downloads. Various algorithms for cache maintenance can be performed. For example, every file downloaded can be assigned a priority value. In some embodiments, the priority value will correlate to the size of the downloaded file, with large files being assigned the highest priorities and small files being assigned the lowest priorities. In some embodiments, assigned priorities will correlate the product of the frequency that the file is requested with the size of that frequently requested file.

Furthermore, files can have revision numbers associated with them. When a firmware file with a revision number that is indicative of a later revision than that of a firmware file (i.e., the same file but having a different revision number that is indicative of an earlier revision), which is stored in the cache memory, then the firmware delivery system 22 with download the requested file, discard the file having the earlier revision number from the cache memory, and store the downloaded file therein.

In some embodiments, firmware delivery system 22 can be a handheld device whose operating power is provided by a battery. In other embodiments, firmware delivery system 22 can be configured to be connected to an external power source. In some embodiments, firmware delivery system 22 can receive operating power from an automobile, such as for example via a power port provided by automobiles for such uses.

Figure 2:
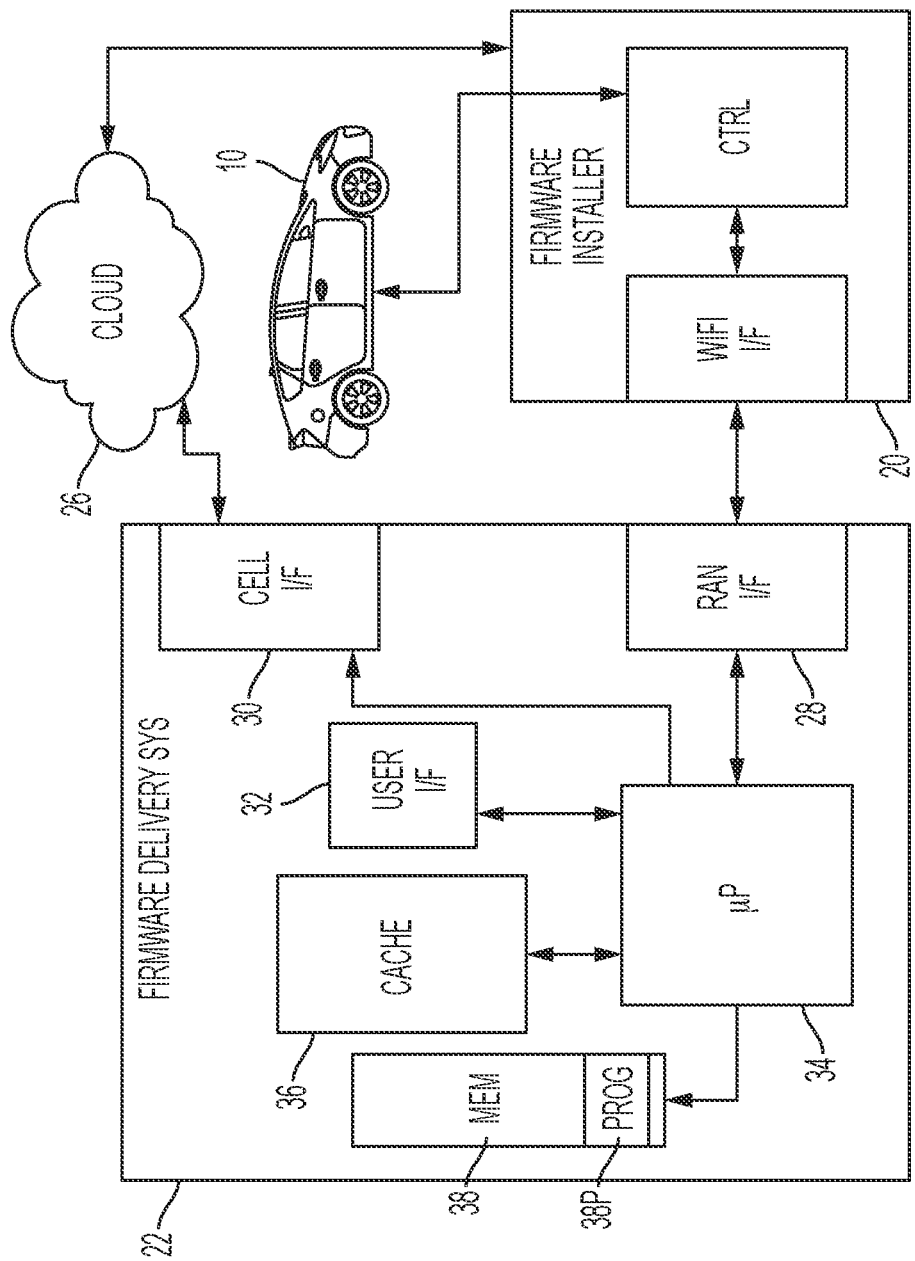
FIG. 2 is a block diagram of a mobile firmware delivery system.

FIG. 2 is a block diagram of a mobile firmware delivery system. In FIG. 2, mobile firmware delivery system 22 is local-area-network connected to ECC configuration device 20, which in turn is in communication with an engine-control computer in automobile 10. Mobile firmware delivery system 22 includes local-area-network interface 28, cellular network interface 30, user interface 32, microprocessor 34, cache memory 36, and computer readable memory 38. Local area network interface 28 provides wired and/or wireless local area network connection to network connected devices, such as, for example, ECC configuration device 20. In some embodiments, local area network interface 28 can include a network interface card, such as an Ethernet card, an optical transceiver, a radio frequency transceiver, or any other type of device that can send and receive information. Other examples of such network interfaces can include Bluetooth, 3G, 4G, and Wi-Fi radio computing devices as well as Universal Serial Bus (USB). In other embodiments, local area network interface 28 can be a custom network interface.

Cellular network interface 30 connects to cloud 26 so as to provide cellular internet connection to local-area-network connected devices, such as ECC configuration device 20. Cellular network interface 30, together with local area network interface 30 and microprocessor 34 can provide smart router functionality for firmware delivery system 22. In various embodiments microprocessor 34 can instead be a controller, a digital signal processor (DSP), an application specific integrated circuit (ASIC), a field-programmable gate array (FPGA), or other equivalent discrete or integrated logic circuitry. In some embodiments, microprocessor 34 can include more than one processing core.

User interface 32 can facilitate communications between firmware delivery system 22 and a human user, such as user U depicted in FIG. 1. User interface 32 can include one or more of a display screen, an audio speaker, a microphone, a keypad, a mouse, a trackball, a trackpad, etc. In some embodiments, user interface 32 is a network interface, which can be used for connection to such user interface devices as listed above. For example, user interface 32 can include a network interface card, such as an Ethernet card, an optical transceiver, a radio frequency transceiver, or any other type of device that can send and receive information. Other examples of such network interfaces can include Bluetooth, 3G, 4G, and Wi-Fi radio computing devices as well as Universal Serial Bus (USB). In other embodiments, local area network interface 28 can be a custom network interface.

To perform the various steps efficiently delivering firmware to be installed in a plurality of remotely located engine-control computers, processor 34 can read program instructions 38P from computer readable memory 38, which cause firmware delivery system 22 to: i) provide local area network (LAN) connection to an ECC configuration device; ii) provide cellular internet connection to the ECC configuration device; iii) receive a request to download a firmware file by the ECC configuration device; iv) download the firmware file requested if the firmware file requested is not stored in a cache memory; and v) provide, without downloading again, the firmware file requested if the firmware file requested is stored in the cache memory.

Computer-readable memory 38 can be configured to store information obtained and/or computed during operation of firmware delivery system 22. Computer-readable memory 38, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can change over time (e.g., in RAM or cache). In some examples, computer-readable memory 38 is a temporary memory, meaning that a primary purpose of computer-readable memory 38 is not long-term storage. Computer-readable memory 38, in some examples, is described as volatile memory, meaning that computer-readable memory 38 do not maintain stored contents when power to firmware delivery system 22 is turned off. Examples of volatile memories can include random-access memories (RAM), dynamic random-access memories (DRAM), static random-access memories (SRAM), and other forms of volatile memories. In some examples, computer-readable memory 38 is used to store program instructions for execution by processor 34. Computer-readable memory 38, in one example, is used by software or applications running on firmware delivery system 22 (e.g., a software program performing such caching and retrieving firmware files) to temporarily store information during program execution.

In some examples, computer-readable memory 38 can also include one or more computer-readable storage media. Computer-readable memory 38 can be configured to store larger amounts of information than volatile memory. Computer-readable memory 38 can further be configured for long-term storage of information. In some examples, computer-readable memory 38 includes non-volatile storage elements. Examples of such non-volatile storage elements can include magnetic hard discs, optical discs, flash memories, or forms of electrically programmable memories (EPROM) or electrically erasable and programmable (EEPROM) memories. Cache memory 36 can be any of the above listed types of computer-readable memory, or it can be of a type that is specific to fast caching of memory.

Figure 3:
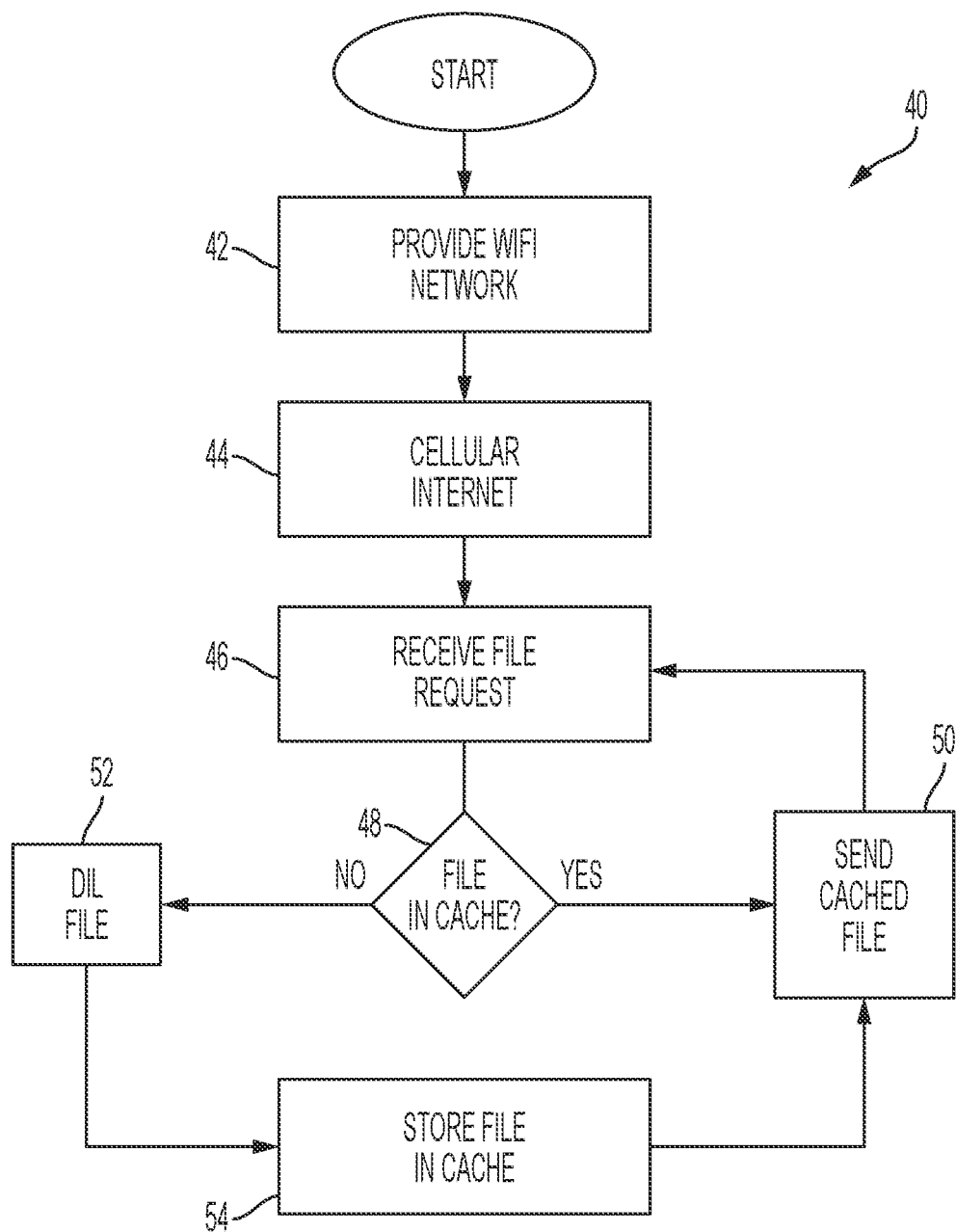
FIG. 3 is a flow chart of a method for efficiently delivering firmware to be installed in a plurality of remotely located engine-control computers.

FIG. 3 is a flow chart of a method for efficiently delivering firmware to be installed in a plurality of remotely located engine-control computers. In FIG. 3, method 40 is presented from the vantage point of microprocessor 34 depicted in FIG. 2. Method 40 begins at step 42, where processor 34 provides Wi-Fi network connection to ECC configuration device 20 (depicted in FIGS. 1 and 2). Such network connection is provided via local area network interface 28 depicted in FIG. 2. Method 40 then proceeds to step 44, where microprocessor 34 connects to cloud 26 via cellular network interface 30 depicted in FIG. 2. Method 40 then proceeds to step 46, where microprocessor 34 waits to receive a request for a firmware file from ECC configuration device 20. In response to receiving such a request, method 40 proceeds to step 48, where microprocessor 34 determines if the firmware file requested by ECC configuration device 20 is stored in cache memory 36. In some embodiments, microprocessor 34 maintains a list of firmware files stored in cache memory 36. Microprocessor can determine if the firmware file requested by ECC configuration device 20 is stored therein by comparing the firmware file requested by ECC configuration device 20 with the list of files stored in cache memory 36. If, at step 48, microprocessor determines that the firmware file requested by ECC configuration device 20 is stored in cache memory 36, then method 40 proceeds to step 50, where the firmware file requested by ECC configuration device 20 is retrieved from cache memory 36 and transmitted to ECC configuration device 20. If, however, at step 48, microprocessor determines that the firmware file requested by ECC configuration device 20 is not stored in cache memory 36, then method 40 proceeds to step 52, where the firmware file requested by ECC configuration device 20 is downloaded from cloud 26. After downloading the firmware file requested by ECC configuration device 20 at step 52, method 40 advances to step 54, where microprocessor 34 stores the firmware file downloaded from cloud 26 in cache memory 36. Then method 40 proceeds to step 50, where the firmware file requested by ECC configuration device 20 is retrieved from cache memory 36 and transmitted to ECC configuration device 20. After step 50, regardless of whether or not the firmware file requested by ECC configuration device 20 needed to be downloaded, method 40 returns to step 46, where microprocessor 34 waits to receive a request for a firmware file from ECC configuration device 20.

Figure 4:
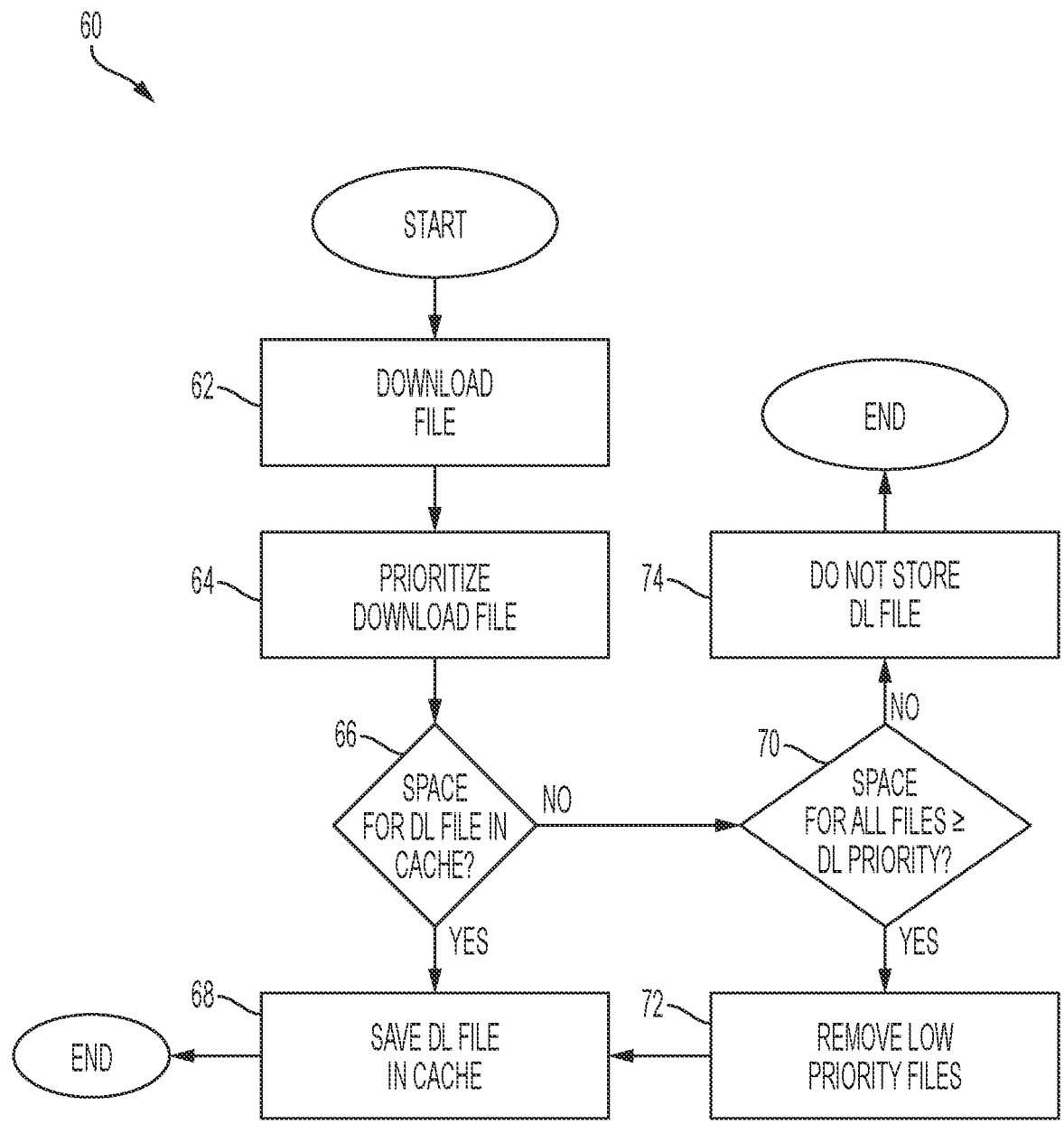
FIG. 4 is a flow chart of a method for prioritizing and storing high priority firmware files.

FIG. 4 is a flow chart of a method for prioritizing and storing high priority firmware files. In FIG. 4, method 60 describes steps 52 and 54 of method 40 (depicted in FIG. 3) in greater detail. In FIG. 4, method 60 is presented from the vantage point of microprocessor 34 depicted in FIG. 2. Method 60 begins at step 62, where microprocessor 34 downloads the firmware file requested by ECC configuration device 20. Method 60 then proceeds to step 64, where microprocessor 34 prioritizes the firmware file downloaded. Such prioritization can be performed in any of the manners described above, which minimize the volume of data downloaded via the cellular network. Method 60 then proceeds to step 66, where microprocessor 34 determines if cache memory 36 has available space, without deleting other firmware files, to store the firmware file downloaded from cloud 26 therein. If, at step 66, microprocessor 34 determines that cache memory 36 has available space, without deleting other firmware files, to store the firmware file downloaded from cloud 26 therein, then method 60 proceeds to step 68, where microprocessor 34 stores the firmware file downloaded from cloud 26 in cache memory 36. If, however, at step 66, microprocessor 34 determines that cache memory 36 has available space, without deleting other firmware files, to store the firmware file downloaded from cloud 26 therein, then method 60 proceeds to step 70 where microprocessor 34 determines if deleting firmware files that have lower priorities than the priority of the firmware file downloaded from cloud 26 frees enough space for the firmware file downloaded from cloud 36 to be stored therein. If, at step 70, microprocessor 34 determines that even by deleting any lower priority files, there would be insufficient space in cache memory 36 to store the firmware file downloaded from cloud 36, then method 60 proceeds to step 74 where the firmware file downloaded from cloud 36 is not stored, but only transmitted to ECC configuration device 20. If, however, at step 70, microprocessor 34 determines that deleting some lower priority files, there would be sufficient space in cache memory 36 (or if space exists without deletion of any files) to store the firmware file downloaded from cloud 36, then method 60 proceeds to step 72. At step 72, any lower priority firmware files needed to free space for the firmware file downloaded are deleted from cache memory 36. From step 72, method 60 returns to step 68, where microprocessor 34 stores the firmware file downloaded from cloud 26 in cache memory 36.

Figure 5:
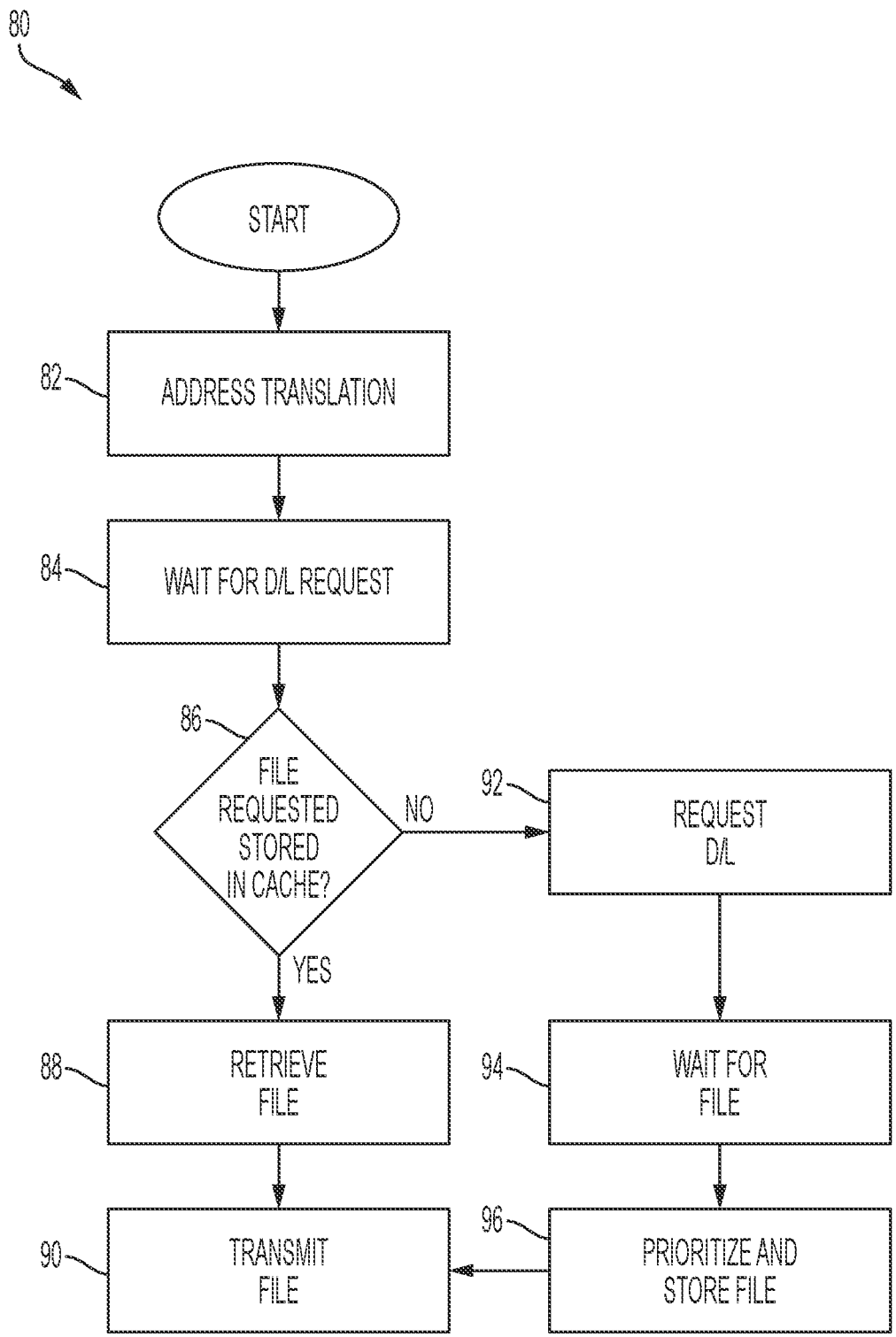
FIG. 5 is a flowchart of a method for intercepting a request to download a firmware file.

FIG. 5 is a flowchart of a method for intercepting a request to download a firmware file. In FIG. 5, method 80 describes steps 46, 48, 50, 52, and 54 of method 40 (depicted in FIG. 3) in greater detail. At least steps 48, 50, 52, and 54 of method 40 can be said to be performed by a request interceptor, which intercepts requests for downloading firmware files from LAN connected devices. In some embodiments, such request interception uses Network Address Translation (NAT) as a technique to divert the request to a private website engine, often internal to the system. In FIG. 5, method 80 is presented from the vantage point of microprocessor 34 depicted in FIG. 2. Method 80 begins at step 82, where microprocessor 34 performs Network Address Translation (NAT) for a predetermined website having a public IP address (e.g., an IPv4 address). Step 82 is not explicitly depicted in the flow chart shown in FIG. 3, but such NAT is the way that requests for downloading a firmware file are intercepted by microprocessor 34, instead of being simply transmitted to the predetermined website. The predetermined website is the website that provides firmware files used to configure ECC computers. The NAT, for example, translates the public IP address to a private IP address, so as to intercept requests to download firmware files from the predetermined website. In some embodiments, such NAT of the predetermined website is only operative for communications from devices connected to the Local Area Network (LAN), as shown being provided by firmware delivery system 22 in FIGS. 1-3.

Then the method proceeds to step 84, where microprocessor 34 waits to receive a request for a firmware file from ECC configuration device 20, which is connected to firmware delivery system 22 via the LAN. Such requests to download a firmware file from the predetermined website are addressed to the predetermined website. Upon receiving such a request, firmware delivery system 22 directs the request to the private IP address corresponding to the NAT of the public IP address. Thus, instead of simply sending the download request to the predetermined website on the internet, because of the NAT, instead the request is automatically directed to the private IP address. A private website engine that handles operation of the private IP address responds to such a request. Such a website engine can be created as code modules of firmware delivery system 22, which can also be executed by microprocessor 34. Upon receiving such a download request, method 80 advances to step 86, where microprocessor 34 determines whether the firmware file requested to be downloaded is stored in cache memory 36. If, at step 36, the firmware file requested is stored in cache memory 36, then method 80 advances to step 88, where the firmware file requested is read from cache memory 36. Then, at step 90, microprocessor 34 transmits the firmware file read from cache memory 36 to ECC configuration device 20. If, however, at step 36, the firmware file requested is not stored in cache memory 36, then method 80 advances to step 92, where microprocessor 34 transmits the request to download the firmware file to the predetermined website. No NAT is performed when such a download request is made by the private IP address. Then, at step 94, microprocessor 34 waits to receive the requested firmware file from the predetermined website. At step 96, microprocessor 34 prioritizes and stores, if so prioritized, the downloaded firmware file in cache memory 36, as described above with reference to FIG. 4. After downloading the firmware file requested, method 80 advances to step 90 where microprocessor 34 transmits the firmware file downloaded to ECC configuration device 20.

Method 80 for intercepting a request to download a firmware file does not require ECC configuration device 20 to be modified. From the perspective of ECC configuration device 20, the request to download the firmware file appears to result in that firmware file simply being downloaded and provided thereto. The source—either cache memory 36 or the predetermined website—of the firmware file received by ECC configuration device 20 is unknown to ECC configuration device 20. Therefore, existing ECC configuration device 20 need not be modified for proper execution of services provided thereby. Method 80 also minimizes the amount of data downloaded from the predetermined website. Such minimization of downloaded data can minimize time and costs associated with downloading data, especially when the internet connection is established via a cellular network.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method for efficiently delivering firmware, via a mobile firmware delivery system, to be installed in a plurality of remotely located engine-control computers, the method comprising:
   providing Local Area Network (LAN) connection to an engine-control computer configuration device (ECC configuration device);
   providing cellular internet connection to the ECC configuration device; performing Network Address Translation (NAT) of a predetermined public Internet Protocol (IP) address to a private IP address;
   receiving a request by the ECC configuration device to download a firmware file from the predetermined public IP address; directing the request to the private IP address corresponding to the predetermined public IP address according to the NAT;
   wherein the request is handled by a private website engine by:
      determining if the firmware file requested is stored in a local cache memory;
      downloading the firmware file requested if the firmware file requested is not stored in the local cache memory;
      retrieving from the local cache memory, without downloading again the firmware file requested if the firmware file requested is stored in the local cache memory; and
      transmitting the firmware file retrieved and/or downloaded to the ECC configuration device.

2. The method of claim 1, further comprising:
   storing the firmware file downloaded in the local cache memory.

3. The method of claim 2, further comprising:
   prioritizing the firmware file stored in the local cache memory, such that a plurality of stored firmware files each are assigned a priority value.

4. The method of claim 3, further comprising:
   removing, via the mobile firmware delivery system, a firmware file stored in the local cache memory with a lower priority value than a priority value of the firmware file downloaded so as to make room for the firmware file downloaded.

5. The method of claim 3, wherein priority of each of the plurality of firmware files stored in the local cache memory is based on sizes of each of the plurality of the firmware files stored.

6. The method of claim 5, wherein larger firmware files stored in the local cache memory have higher priorities than smaller firmware files, thereby reducing a need for repeated downloading of the larger firmware files.

7. The method of claim 3, wherein priority of each of the plurality of firmware files stored in the local cache memory is further based on date or time of revision.

8. The method of claim 3, wherein priority of each of the plurality of firmware files stored in the local cache memory is based on frequency of download request.

9. The method of claim 1, wherein determining whether the firmware file requested is stored in the local cache memory comprises:
   maintaining a list of firmware files stored in the local cache memory; and
   comparing the firmware file requested with the list of firmware files stored in the local cache memory.

10. The method of claim 1, wherein Network Address Translation (NAT) of the predetermined public IP address to the private IP address is only performed on communications originating from LAN connected devices that are external to the mobile firmware delivery system.

11. A system for efficiently delivering firmware to be installed in a plurality of remotely located engine-control computers, the system comprising:
- a smart router system that provides cellular internet connection and Local Area Network (LAN) connection to an engine-control computer configuration device (ECC configuration device);
- a cache memory for storing firmware files;
- a request interceptor that:
    - performs Network Address Translation (NAT) of a predetermined public Internet Protocol (IP) address to a private IP address;
    - receives a request by the ECC configuration device to download a firmware file from the predetermined public IP address;
    - directs the request to the private IP address corresponding to the predetermined public IP address according to the NAT;
    - determines if the firmware file requested is stored in a local cache memory;
    - downloads the firmware file requested if the firmware file requested is not stored in the local cache memory;
    - retrieves from the local cache memory, without downloading again, the firmware file requested if the firmware file requested is stored in the local cache memory;
    - transmits the firmware file retrieved and/or downloaded to the ECC configuration device.

12. The system of claim 11, wherein the request interceptor stores the firmware file downloaded in the local cache memory.

13. The system of claim 12, wherein the request interceptor prioritizes the firmware file stored in the local cache memory, such that a plurality of stored firmware files each are assigned a priority value.

14. The system of claim 13, wherein the request interceptor removes a firmware file stored in the local cache memory with a lower priority value than a priority value of the firmware file downloaded, so as to make room for a firmware file with a higher priority value.

15. The system of claim 13, wherein priority of each of the plurality of firmware files stored in the local cache memory is based on sizes of the firmware files.

16. The system of claim 15, wherein larger firmware files stored in the local cache memory have higher priorities than smaller firmware files, thereby reducing a need for repeated downloading of the larger firmware files.

17. The system of claim 13, wherein priority of each of the plurality of firmware files stored in the local cache memory is based on date or time of revision.

18. The system of claim 13, wherein priority of each of the plurality of firmware files stored in the local cache memory is based on frequency of download request.

19. The system of claim 11, wherein the system receives operating power via an automobile.

20. The system of claim 11, wherein Network Address Translation (NAT) of the predetermined public IP address to the private IP address is only performed on communications originating from LAN connected devices that are external to the mobile firmware delivery system.

\* \* \* \* \*